United States Patent
Singh et al.

(10) Patent No.: US 8,442,012 B1
(45) Date of Patent: May 14, 2013

(54) SELECTING WIRELESS ACCESS RESOURCES BASED ON PAST WIRELESS ACTIVITY

(75) Inventors: Jasinder Pal Singh, Olathe, KS (US); Maulik K. Shah, Overland Park, KS (US); Siddharth S. Oroskar, Overland Park, KS (US); Bhagwan Singh Khanka, Lenexa, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 335 days.

(21) Appl. No.: 12/818,585

(22) Filed: Jun. 18, 2010

(51) Int. Cl.
*H04B 7/216* (2006.01)

(52) U.S. Cl.
USPC .......................................... 370/335

(58) Field of Classification Search .......... 370/329, 370/335; 455/509
See application file for complete search history.

(56) References Cited

U.S. PATENT DOCUMENTS

| | | | |
|---|---|---|---|
| 5,734,646 A * | 3/1998 | I et al. | 370/335 |
| 6,069,883 A * | 5/2000 | Ejzak et al. | 370/335 |
| 6,980,811 B2 | 12/2005 | Harris | |
| 7,408,974 B2 | 8/2008 | Yarkosky | |
| 2005/0043048 A1 * | 2/2005 | Dolan et al. | 455/509 |
| 2008/0101228 A1 * | 5/2008 | Rodriguez et al. | 370/232 |
| 2008/0101288 A1 * | 5/2008 | Wan | 370/329 |

FOREIGN PATENT DOCUMENTS

| | | |
|---|---|---|
| WO | 2006116618 | 11/2006 |
| WO | 2007020515 | 2/2007 |
| WO | 2007086679 | 8/2007 |

OTHER PUBLICATIONS

U.S. Appl. No. 12/726,510, filed Mar. 18, 2010.

* cited by examiner

*Primary Examiner* — Raj Jain

(57) ABSTRACT

What is disclosed is a method of operating a wireless communication system, where a wireless access system provides wireless access to communication services for wireless communication devices. The method includes receiving a request to initiate a first communication session for a first wireless communication device, processing past dropped communication session information for the first wireless communication device to select a radio configuration type of wireless access resources for the first communication session, and providing the wireless access resources for the first communication session to the first wireless communication device using the selected radio configuration type.

20 Claims, 6 Drawing Sheets

SELECTING WIRELESS ACCESS RESOURCES BASED ON PAST WIRELESS ACTIVITY

TECHNICAL FIELD

Aspects of the disclosure are related to the field of communications, and in particular, selecting wireless access resources for wireless communication devices based on past wireless activity in wireless communication networks.

TECHNICAL BACKGROUND

Wireless communication systems provide wireless access to communication services for user devices, such as wireless communication devices. Typically, wireless communication systems include wireless access equipment, such as base stations and associated interconnection, backhaul, and control equipment, as a part of a wireless access system to provide the wireless access across a geographic area. Wireless communication devices allow users to establish voice calls and exchange data communications with other devices, users, or systems.

As a part of providing the wireless access, a registration or initialization process typically occurs between the wireless access system and wireless communication devices. This registration process can occur when a communication session is initiated by a wireless communication device, or when a wireless communication device transitions between equipment providing the wireless access, such as during handoffs. The registration process typically includes handshaking and information exchange between the wireless access system and the wireless communication device, used to configure and assign wireless access resources for wireless links, such as a radio configuration type of the wireless access resources. Radio configuration types can include parameters such as spreading code assignments, error correction coding rates, other coding rates, modulation types, spreading rates, or a combination of parameters used by equipment of the wireless access system for communicating over a wireless link with a wireless communication device.

OVERVIEW

What is disclosed is a method of operating a wireless communication system, where a wireless access system provides wireless access to communication services for wireless communication devices. The method includes receiving a request to initiate a first communication session for a first wireless communication device, processing past dropped communication session information for the first wireless communication device to select a radio configuration type of wireless access resources for the first communication session, and providing the wireless access resources for the first communication session to the first wireless communication device using the selected radio configuration type.

What is also disclosed is a wireless communication system, where a wireless access system provides wireless access to communication services for wireless communication devices. The wireless access system configured is to receive a request to initiate a first communication session for a first wireless communication device, process past dropped communication session information for the first wireless communication device to select a radio configuration type of wireless access resources for the first communication session, and provide the wireless access resources for the first communication session to the first wireless communication device using the selected radio configuration type.

What is also disclosed is a method of operating a wireless communication system, where a wireless access system provides wireless access to communication services for wireless communication devices. The method includes receiving a request to initiate a first communication session for a first wireless communication device. The method also includes processing past dropped communication session information for the first wireless communication device to select a radio configuration type of wireless access resources for the first communication session, where the past dropped communication session information comprises information correlating radio configuration types in use during past dropped communication sessions between the first wireless communication device and the wireless access system, and where the radio configuration type comprises a spreading code assignment for the first communication session provided to the first communication device. The method also includes notifying the first wireless communication device of the selected radio configuration type for the first communication session, and providing the wireless access resources for the first communication session to the first wireless communication device using the selected radio configuration type.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
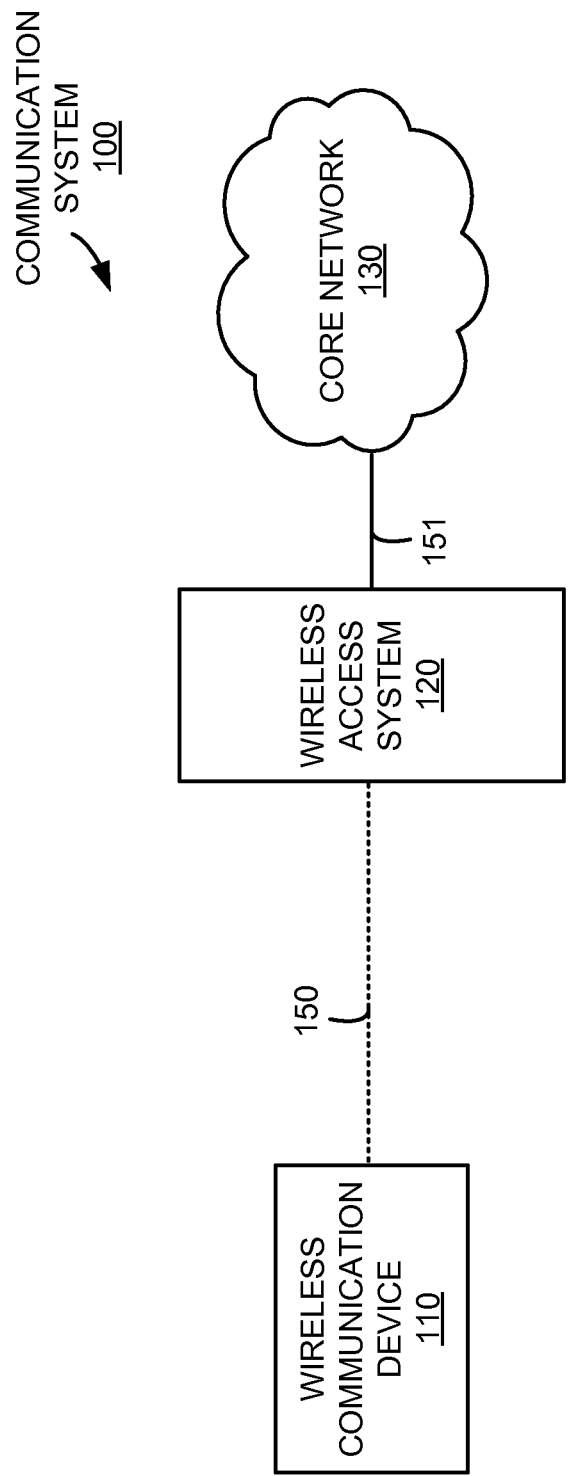
FIG. 1 is a system diagram illustrating a communication system.

FIG. 1 is a system diagram illustrating communication system 100. Communication system 100 includes wireless communication device 110, wireless access system 120, and core network 130. Wireless communication device 110 and wireless access system 120 can communicate over wireless link 150. Wireless access system 120 and core network 130 communicate over link 151. In FIG. 1, wireless access system 120 provides wireless access to communication services for wireless communication devices, such as wireless communication device 110. As a part of providing the wireless access, a registration or initialization process typically occurs, such as when a communication session is desired by a wireless communication device. This registration process can include wireless access system 120 providing network information to wireless communication device 110, such as a radio configuration type of wireless access resources for wireless link 150.

Figure 2:
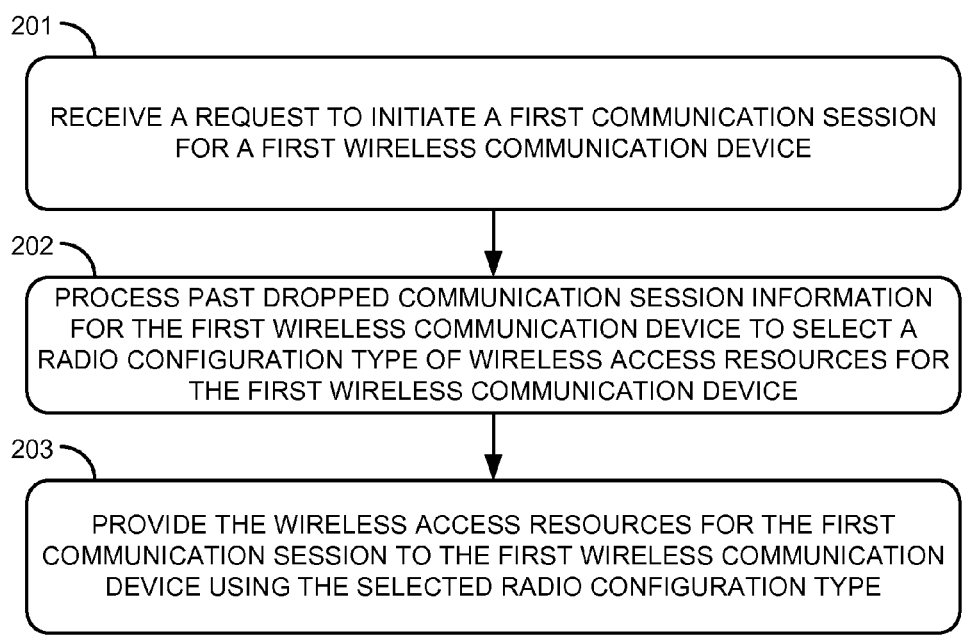
FIG. 2 is a flow diagram illustrating a method of operation of a communication system.

FIG. 2 is a flow diagram illustrating a method of operation of communication system 100. The operations of FIG. 2 are referenced herein parenthetically. In FIG. 2, wireless access system 120 receives (201) a request to initiate a first communication session for wireless communication device 110. In typical examples, the request to initiate the first communication session is transferred by wireless communication device 110 in response to user or application activity on wireless communication device 110, where the request is wirelessly transferred over wireless link 150 for receipt by wireless access system 120. The request to initiate the first communication session could include, for example, a request to initiate a voice call or data session with wireless access system 120. The request could include information about wireless communication device 110, such as device identifiers, user information, network addresses, a requested communication session type, among other information. In some examples, the request includes information to identify an endpoint involved in the first communication session, such as equipment or systems associated with core network 130.

Wireless access system 120 processes (202) past dropped communication session information for wireless communication device 110 to select a radio configuration type of wireless access resources for wireless communication device 110. The past dropped communication session information includes, in some examples, a information correlating past dropped communication sessions for wireless communication device 110 with a radio configuration type in use by wireless communication device 110 for each dropped communication session. The past dropped communication session information could also include time information, date information, location information, communication session type, identifiers for wireless communication device 110, identifiers for equipment in wireless access system 120 providing the dropped communication session to wireless communication device 110, or other information of past dropped communication sessions. A radio configuration type could include parameters used by wireless access system 120 in providing the wireless access resources for the first communication session. For example, the radio configuration type could describe a single parameter or multiple parameters, which are used to establish the first communication session over wireless link 150 between wireless communication device 110 and wireless access system 120. The radio configuration type could include parameters such as a spreading code assignment, error correction coding rate, other coding rate, modulation type, or spreading rate, or a combination of parameters.

The past dropped communication session information could be processed to select among predetermined radio configuration types. For example, the predetermined radio configuration types could be predefined by a wireless protocol in use over wireless link 150. In other examples, the radio configuration type includes a combination or group or parameters which are selected by processing the past dropped communication session information. In other examples, the past dropped communication session information is processed to determine if an amount of past dropped communication sessions using a particular a radio configuration type are above a threshold, below a threshold, or higher for the particular radio configuration type than for another radio configuration type. In further examples, the selected radio configuration type is further processed to select another radio configuration type, such as a different radio configuration type, based on anticipated communication session handoffs to other equipment in wireless access system 120.

Once the radio configuration type has been selected, wireless access system 120 provides (203) the wireless access resources for the first communication session to wireless communication device 110 using the selected radio configuration type. Wireless access resources could include channels, frequencies, timeslots, bandwidth, paging channels, or other resources of wireless link 150. These wireless access resources could be assigned to wireless communication device 110 by wireless access system 120 and provided using the selected radio configuration type. Communications of the first communication session would then use the selected radio configuration type for the wireless access resources. In some examples, wireless communication device 110 exchanges communications of a communication service provided by equipment or systems of core network 130. Wireless access system 120 could provide wireless access for the communication service over wireless link 150 during the first communication session using the selected radio configuration type.

Figure 3:
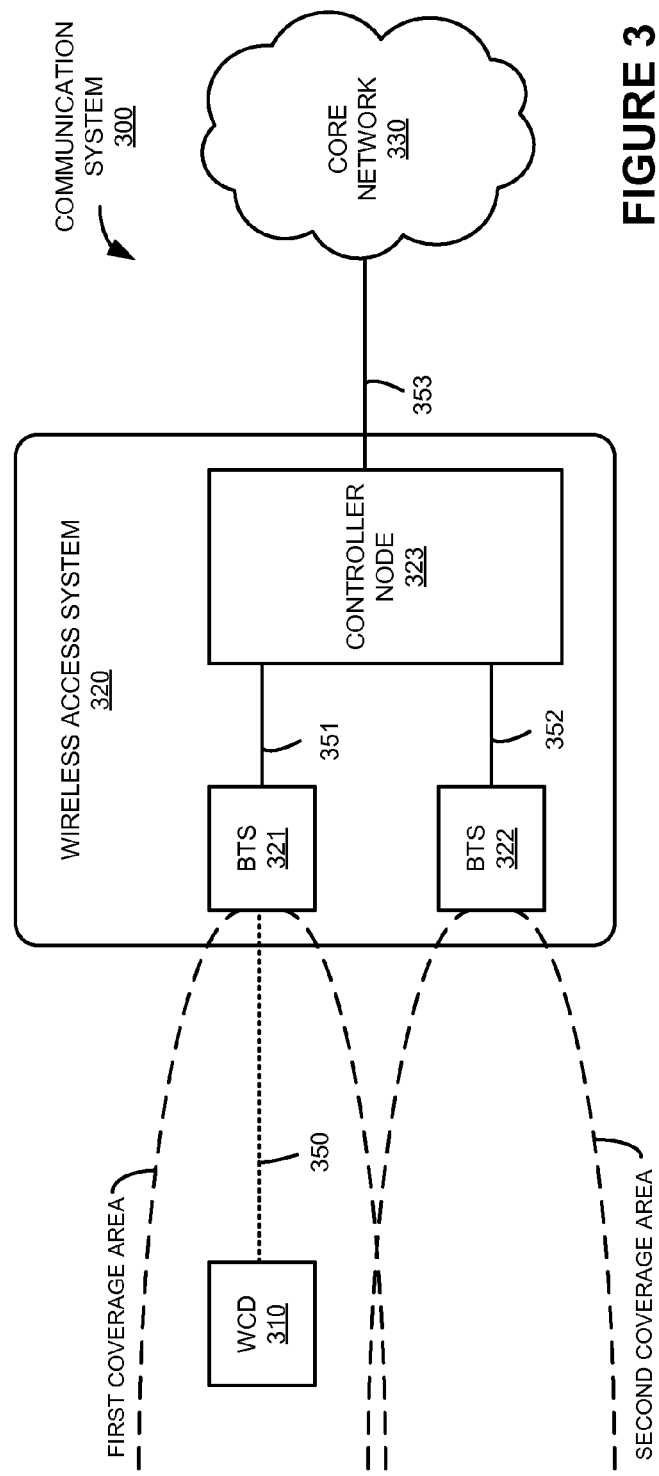
FIG. 3 is a system diagram illustrating a communication system.

FIG. 3 is a system diagram illustrating communication system 300. Communication system 300 includes wireless communication device (WCD) 310, wireless access system 320, and core network 330. Wireless communication device 310 and wireless access system 320 can communicate over wireless link 350. In this example, wireless link 350 is a CDMA wireless link. Wireless access system 320 and core network 330 can communicate over link 353. In this example, link 353 is an optical metropolitan-area networking link.

Wireless access system 320 includes two base transceiver stations (BTS), namely BTS 321-322, as well as controller node 323. BTS 321 and controller node 323 communicate over T1 backhaul link 351, and BTS 322 and controller node 323 communicate over T1 backhaul link 352. In FIG. 3, BTS 321 and BTS 322 each provide wireless access to communication services for wireless communication devices within different coverage areas. The coverage areas of wireless access system 320 are shown by the dotted boundaries denoting a first coverage area and a second coverage area. It should be understood that although the coverage area boundaries are shown as expanding from each of BTS 321-322 of wireless access system 320, other shapes and configurations could be used to represent the individual coverage areas. As part of the wireless access provided by wireless access system 320, wireless communication device 310 may transition from receiving wireless access in one coverage area to receiving wireless access in another coverage area, due to motion, radio frequency (RF) conditions, or other factors. These transitions between coverage areas are typically referred to as handoffs, where handoff communications are used to arrange, setup, or initiate handoff messaging before an actual handoff from one coverage area to another is performed. As shown in FIG. 3, communication with wireless communication device 310 in a first coverage area of wireless access system 320 can occur over wireless link 350. Handoff messaging or other communications may occur between wireless communication device 310 and the first coverage area as well as the second coverage area. If wireless communication device 310 transitions to receiving wireless access from the second coverage area, then further communications would occur over a wireless link with BTS 322.

Controller node 323 could include a base station controller (BSC), radio node controller (RNC), routers, or other systems to route communications to/from core network 330 and control the operations of BTS 321-322 over backhaul links 351-352, respectively. Core network 330 includes the core network of a wireless communication network in this example, and could include further wireless access systems, base stations, routers, controller nodes, or servers, among other user, communication, and control equipment.

Figure 4:
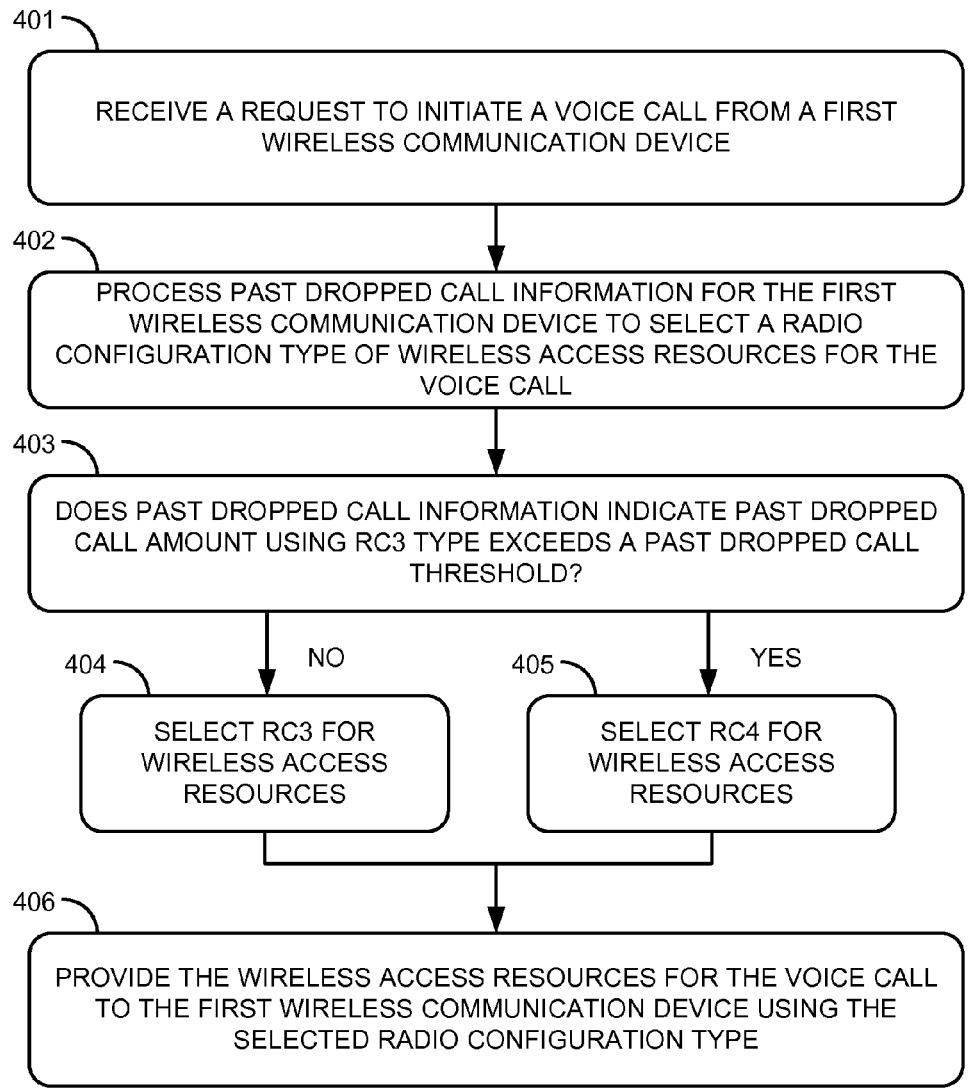
FIG. 4 is a flow diagram illustrating a method of operation of a communication system.

FIG. 4 is a flow diagram illustrating a method of operating communication system 300. The operations of FIG. 4 are referenced herein parenthetically. In FIG. 4, wireless access system 320 receives (401) a request to initiate a voice call from a wireless communication device 310. The request to initiate the voice call is transferred by wireless communication device 310 in response to user or application activity on wireless communication device 310, such as a user dialing a phone number, seeking a username, or identifying a destination network address. The request is wirelessly transferred over wireless link 350 for receipt by BTS 321 of wireless access system 320. BTS 321 communicates the request to initiate the voice call to controller node 323 over backhaul link 351. In typical examples, the request to initiate the voice call includes information about the voice call, such as a destination user or number, an identifier of wireless communication device 310, user information, network addresses, or a requested communication session type, among other information. In this example, wireless communication device 310 transfers the request while in the first coverage area.

In response to the request to initiate the voice call, controller node 323 of wireless access system 320 processes (402) past dropped call information for wireless communication device 310 to select a radio configuration type of wireless access resources for the voice call. The past dropped call information includes, in this example, information correlating past dropped voice calls for wireless communication device 310 with a radio configuration type in use by wireless communication device 310 for each dropped voice call. The past dropped call information could also include time information, date information, location information, communication session type, identifiers for wireless communication device 310, identifiers for equipment in wireless access system 320 providing the dropped voice call to wireless communication device 310, or other information of past dropped voice calls. It should be understood that dropped calls include failed communication sessions, where a user does not intend for the communication session to end. In this example, the past dropped call information is stored in wireless access system 320, such as in a computer storage system, database, or server, which could be included in controller node 323 or in other systems of wireless access system 320. The radio configuration type includes parameters used by BTS 321 of wireless access system 320 in providing the wireless access resources for the voice call. In this example, the radio configuration type includes a combination of parameters which include an error correction coding rate, modulation type, and spreading rate used over wireless link 350 for the voice call.

Also in this example, the past dropped call information is processed to select among two predetermined radio configuration types, namely Radio Configuration 3 (RC3) and Radio Configuration 4 (RC4) of the CDMA wireless communication mode, although other radio configuration types could be selected. Controller node 323 of wireless access system 320 determines (403) if the past dropped call information indicates a past dropped call amount using the RC3 type exceeds a past dropped call threshold. The past dropped call threshold could include a threshold number of dropped calls while wireless communication device 310 is communicating using the RC3 type, or an aggregate dropped call amount for many wireless communication devices using the RC3 type. If the past dropped call amount does not exceed the past dropped call threshold (404), then controller node 323 selects the RC3 type for the wireless access resources of the voice call. If the past dropped call amount exceeds the past dropped call threshold (405), then controller node 323 selects the RC4 type for the wireless access resources of the voice call.

Once the radio configuration type has been selected, wireless access system 320 provides (406) the wireless access resources for the voice call to wireless communication device 310 using the selected radio configuration type. In this example, wireless link 350 uses the CDMA wireless communication mode and protocol, and the wireless access resources include traffic channel assignments, overhead messaging, and other resources to initiate and provide the voice call over wireless link 350. As discussed herein, wireless link 350 could include multiple portions, such as channels, frequencies, or timeslots, which could use different radio configuration types. However, in this example, the selected radio configuration type is used for user communications of the voice call.

Figure 5:
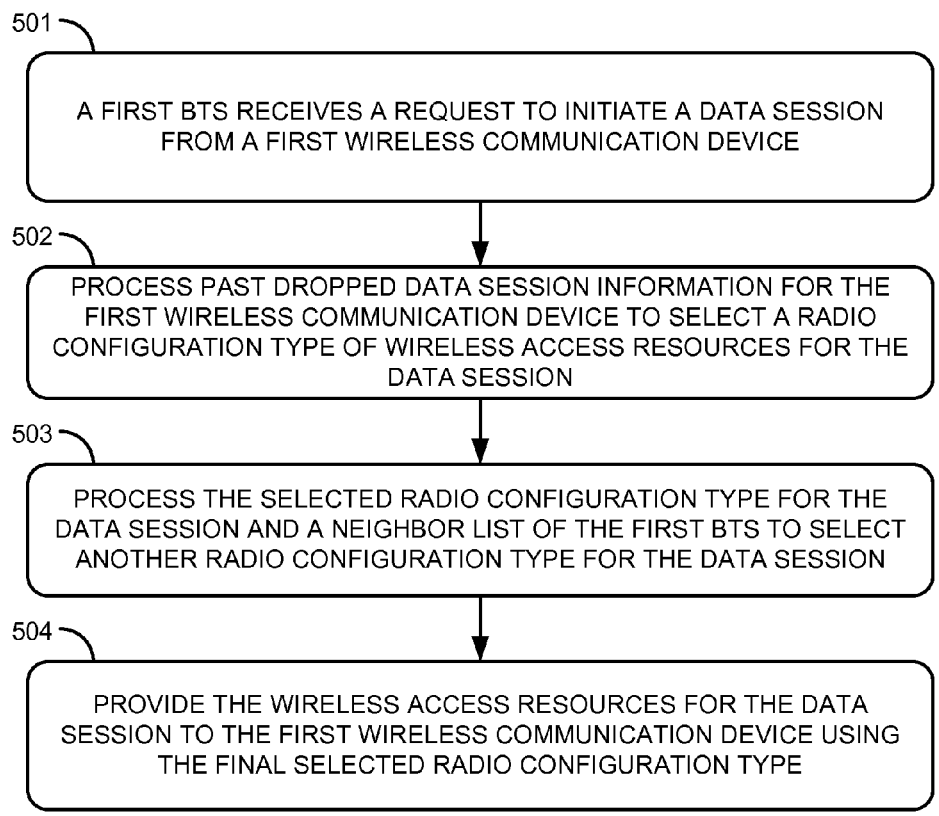
FIG. 5 is a flow diagram illustrating a method of operation of a communication system.

FIG. 5 is a flow diagram illustrating a method of operating communication system 300. The operations of FIG. 5 are referenced herein parenthetically. In FIG. 5, a first BTS, namely BTS 321 of wireless access system 320, receives (501) a request to initiate a data session from wireless communication device 310. The request to initiate the data session is transferred by wireless communication device 310 in response to user or application activity on wireless communication device 310, such as a user accessing a web page or selecting a video to stream. The request is wirelessly transferred over wireless link 350 for receipt by BTS 321 of wireless access system 320. BTS 321 communicates the request to initiate the data session to controller node 323 over backhaul link 351. In typical examples, the request to initiate the data session includes information about the data session, such as a destination network address, web address, an identifier of wireless communication device 310, user information, or a requested communication session type, among other information. In this example, wireless communication device 310 transfers the request while in the first coverage area.

In response to the request to initiate the data session, controller node 323 of wireless access system 320 processes (502) past dropped data session information for wireless communication device 310 to select a radio configuration type of wireless access resources for the data session. The past dropped data session information includes, in this example, information correlating past dropped data sessions for wireless communication device 310 with a radio configuration type in use by wireless communication device 310 for each dropped data session. The past dropped data session information could also include time information, date information, location information, communication session type, identifiers for wireless communication device 310, identifiers for equipment in wireless access system 320 providing the dropped data session to wireless communication device 310, or other information of past dropped data sessions. It should be understood that a dropped data sessions include failed communication sessions, where a user does not intend for the communication session to end. In this example, the past dropped data session information is received from wireless communication device 310. The past dropped data session information could be stored on a computer-readable medium in wireless communication device 310 and transferred by wireless communication device 310 over wireless link 350 for receipt by BTS 321 and controller node 323. The radio configuration type includes parameters used by BTS 321 of wireless access system 320 in providing the wireless access resources for the data session. In this example, the radio configuration type includes a spreading code assignment, such as a Walsh code, used over wireless link 350 for the data session.

Once the radio configuration type has been selected for the data session based on past dropped data session information, controller node 323 of wireless access system 320 processes (503) the selected radio configuration type for the data session and a neighbor list of BTS 321 to select another radio configuration type of the data session. A neighbor list can include a list of base stations, base transceiver stations, or other wireless access equipment in nearby coverage areas to the first coverage area of FIG. 3. In this example, the neighbor list includes the second coverage area provided by BTS 322, although it should be understood that in other examples a different number or configuration of coverage areas could be employed. In further examples, coverage areas are subdivided into sectors, each served with a separate antenna or antenna array, and the neighbor list could include a listing of nearby sectors. The neighbor list could be based upon nearby coverage areas to BTS 321, or could be based upon nearby coverage areas to wireless communication device 310. In some examples, the neighbor list is an active set, neighbor set, or candidate set of wireless communication device 310.

In some examples, processing the selected radio configuration type for the data session and the neighbor list of BTS 321 to select the other radio configuration type includes selecting the other radio configuration type based upon utilization of the initially selected radio configuration type for wireless access resources of the neighbor base stations in the neighbor list. For example, if the initially selected radio configuration type as selected in operation 502 is a first radio configuration type, the utilization of that first radio configuration type at a neighbor base station is processed to determine if the utilization would allow for a future handoff of wireless communication device 310 from BTS 321 to the neighboring base station. If the utilization of the initially selected radio configuration type is too high, such as when the utilization exceeds a utilization threshold, then controller node 323 can select a different radio configuration type. In typical examples, when a wireless communication device which is receiving wireless access using a first radio configuration type from a first BTS attempts to handoff to a second BTS where wireless access resources are not available over the first radio configuration type, the handoff does not allow for a continuous communication session, leading to a dropped communication session. For example, a voice call initiated at a first BTS may be dropped when attempting to handoff to another BTS if the same radio configuration type is not available for wireless access resources at the other BTS. In yet further examples, a BTS could reserve wireless access resources for the first radio configuration type before receiving any requests to initiate the data session or handoffs, where the reserved wireless access resources for the first radio configuration type are reserved for wireless communication devices handing off from another BTS.

Once the radio configuration type has been selected, wireless access system 320 provides (504) the wireless access resources for the data session to wireless communication device 310 using the final selected radio configuration type. A notification of the selected radio configuration type is first transferred to wireless communication device 310 over wireless link 350. In this example, wireless link 350 uses the CDMA wireless communication mode and protocol, and the wireless access resources include traffic channel assignments, overhead messaging, and other resources to initiate the data session and communicate over wireless link 350. As discussed herein, wireless link 350 could include multiple portions, such as channels, frequencies, or timeslots, which could use different radio configuration types. However, in this example, the selected radio configuration type is used for user communications of the data session. Also, as discussed in this example, another radio configuration type is selected after an initially selected radio configuration type. It should be understood that a different radio configuration type may not necessarily be selected based upon the neighbor list information, as the initial selection could be confirmed and chosen as the final selected radio configuration type.

Figure 6:
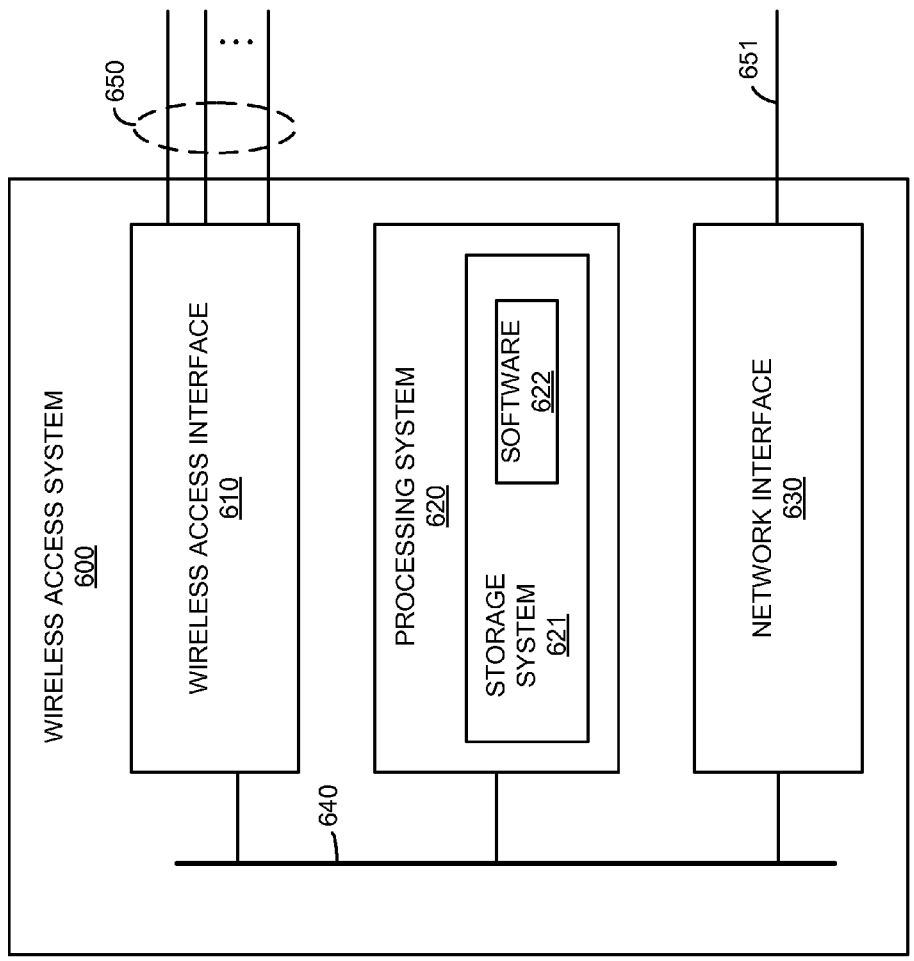
FIG. 6 is a block diagram illustrating a wireless access system.

FIG. 6 is a block diagram illustrating wireless access system 600, as an example of wireless access system 120 found in FIG. 1 or wireless access system 320 found in FIG. 3, although wireless access control 120 or wireless access system 320 could use other configurations. Wireless access system 600 includes wireless access interface 610, processing system 620, and network interface 630. Wireless access interface 610, processing system 620, and network interface 630 communicate over bus 640. Wireless access system 600 may be distributed among multiple devices that together form elements 610, 620-622, 630, 640, and 650-651.

Wireless access interface 610 comprises communication interfaces for communicating with and controlling the operations of wireless communication devices or base stations over links 650. Wireless access interface 610 also receives command and control information and instructions from processing system 620 or network interface 630 for controlling the operations of wireless communication devices or base stations over links 650, exchanging handoff communications of wireless communication devices between base stations, receiving past dropped communication session information, providing wireless access resources for communication sessions using selected radio configuration types, among other operations. Links 650 could each use various protocols or communication formats as described herein for wireless link 150, wireless link 350, or links 351-352, including combinations, variations, or improvements thereof.

Processing system 620 includes storage system 621. Processing system 620 retrieves and executes software 622 from storage system 621. In some examples, processing system 620 is located within the same equipment in which wireless access interface 610 or network interface 630 are located. In further examples, processing system 620 comprises specialized circuitry, and software 622 or storage system 621 could be included in the specialized circuitry to operate processing system 620 as described herein. Storage system 621 could include a computer-readable medium such as a disk, tape, integrated circuit, server, or some other memory device, and also may be distributed among multiple memory devices. Software 622 may include an operating system, logs, utilities, drivers, networking software, and other software typically loaded onto a computer system. Software 622 could contain an application program, firmware, or some other form of computer-readable processing instructions. When executed by processing system 620, software 622 directs processing system 620 to operate as described herein to at least provide wireless access for wireless communication devices, exchange handoff communications, receive requests to initiate communication sessions, and process past dropped communication session information to select radio configuration types of wireless access resources for wireless communication devices, among other operations.

Network interface 630 comprises network router and gateway equipment for communicating with a core network of a wireless communication provider, such as with core network 130 or core network 330. Network interface 630 exchanges user communications and overhead communications with a core network of a wireless communication system over link 651. Link 651 could use various protocols or communication formats as described herein for links 151 or 353, including combinations, variations, or improvements thereof.

Bus 640 comprises a physical, logical, or virtual communication link, capable of communicating data, control signals, power, and communications, along with other information. In some examples, bus 640 is encapsulated within the elements of wireless access interface 610, processing system 620, or network interface 630, and may be a software or logical link. In other examples, bus 640 uses various communication media, such as air, space, metal, optical fiber, or some other signal propagation path, including combinations thereof. Bus 640 could be a direct link or might include various equipment, intermediate components, systems, and networks.

Referring back to FIG. 1, wireless communication device 110 comprises radio frequency (RF) communication circuitry and antenna elements. The RF communication circuitry typically includes amplifiers, filters, modulators, and signal processing circuitry. In many examples, wireless communication device 110 includes circuitry and equipment to exchange communications of wireless communication services over wireless links with wireless access systems, request communication services, determine past dropped communication session information, or receive radio configuration types for wireless access resources, among other operations. Wireless communication device 110 may also include user interface systems, memory devices, computer-readable storage mediums, software, processing circuitry, or other communication components. Wireless communication device 110 may be a user device, subscriber equipment, customer equipment, access terminal, telephone, mobile wireless telephone, computer, e-book, mobile Internet appliance, wireless network interface card, media player, game console, or some other wireless communication apparatus, including combinations thereof. Although one wireless communication device is shown in FIG. 1, it should be understood that a different number of wireless communication devices could be shown.

Wireless access system 120 comprises RF communication and control circuitry, antenna elements, and communication routing equipment and systems. The RF communication circuitry typically includes amplifiers, filters, RF modulators, transceivers, and signal processing circuitry. In many examples, wireless access system 120 includes equipment to provide wireless access to communication services within different coverage areas to user devices such as wireless communication device 110 shown in FIG. 1, route user communications between core network 130 and wireless communication devices, or provide network information, handoff information, or radio configuration type selections to wireless communication devices, among other operations. Wireless access system 120 may also comprise data modems, routers, servers, memory devices, software, processing systems, cabling, network communication interfaces, physical structural supports, or other communication apparatuses. Wireless access system 120 may also comprise base stations, base transceiver stations (BTS), base station controllers (BSC), mobile switching centers (MSC), radio node controllers (RNC), or other communication equipment and apparatuses.

Core network 130 could include further wireless access systems, or could include base station controllers (BSC), mobile switching centers (MSC), radio node controllers (RNC), call processing systems, authentication, authorization and accounting (AAA) equipment, access service network gateways (ASN-GW), Internet access nodes, telephony service nodes, wireless data access points, or other wireless communication systems, including combinations thereof. Core network 130 may also comprise optical networks, asynchronous transfer mode (ATM) networks, packet networks, metropolitan-area networks (MAN), or other network topologies, equipment, or systems, including combinations thereof. In typical examples, core network 130 includes many wireless access systems and associated equipment for providing communication services to many user devices across a geographic region.

Wireless link 150 uses the air or space as the transport media. Wireless link 150 may use various protocols, such as Code Division Multiple Access (CDMA), Evolution-Data Optimized (EV-DO), single-carrier radio transmission technology link (1xRTT), Worldwide Interoperability for Microwave Access (WIMAX), Global System for Mobile Communication (GSM), Universal Mobile Telecommunications System (UMTS), Long Term Evolution (LTE), Wireless Fidelity (WIFI), High Speed Packet Access (HSPA), Radio Link Protocol (RLP), or some other wireless communication format, including combinations, improvements, or variations thereof. Although one wireless link 150 is shown in FIG. 1, it should be understood that this wireless link is merely illustrative to show communications with wireless access system 120.

Communication link 151 uses metal, glass, optical, air, space, or some other material as the transport media. Communication link 151 could use various communication protocols, such as Time Division Multiplex (TDM), asynchronous transfer mode (ATM), Internet Protocol (IP), Ethernet, synchronous optical networking (SONET), circuit-switched, communication signaling, or some other communication format, including combinations, improvements, or variations thereof. Communication link 151 could be a direct links or may include intermediate networks, systems, or devices.

Links 150-151 may each include many different signals sharing the same link—as represented by the associated lines in FIG. 1—comprising access channels, paging channels, notification channels, forward links, reverse links, user communications, communication sessions, overhead communications, frequencies, other channels, carriers, timeslots, spreading codes, transportation ports, logical transportation links, network sockets, packets, or communication directions. In many examples, the portion of wireless link 150 as transmitted by wireless communication device 110 is referred to an uplink or reverse link of the wireless link, while the portion as transmitted by wireless access system 120 is referred to as a downlink or forward link of the wireless link.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication system, wherein a wireless access system provides wireless access to communication services for wireless communication devices, the method comprising:
   receiving a request to initiate a first communication session for a first wireless communication device;
   processing past dropped communication session information for the first wireless communication device to select a radio configuration type of wireless access resources for the first communication session; and providing the wireless access resources for the first communication session to the first wireless communication device using the selected radio configuration type.

2. The method of claim 1, further comprising:
receiving the past dropped communication session information for the first wireless communication device from the first wireless communication device.

3. The method of claim 1, wherein the radio configuration type comprises a spreading code assignment for the first communication session provided to the first communication device.

4. The method of claim 1, wherein the radio configuration type comprises a coding rate, modulation type, and spreading rate combination for the first communication session provided to the first communication device.

5. The method of claim 1, wherein the past dropped communication session information comprises information correlating radio configuration types in use during past dropped communication sessions between the first wireless communication device and the wireless access system.

6. The method of claim 1, wherein processing the past dropped communication session information for the first wireless communication device to select the radio configuration type of the wireless access resources for the first communication session comprises selecting between the wireless access resources of a first radio configuration type and of a second radio configuration type, and further comprising:
if the past dropped communication session information indicates a past dropped communication session amount is above a past dropped communication session threshold for the first radio configuration type, then selecting the second radio configuration type as the selected radio configuration type; and
if the past dropped communication session information indicates the past dropped communication session amount is below the past dropped communication session threshold for the first radio configuration type, then selecting the first radio configuration type as the selected radio configuration type.

7. The method of claim 6, wherein the first radio configuration type comprises a Code Division Multiple Access (CDMA) Radio Configuration type 3 (RC3) radio configuration type, and the second radio configuration type comprises a CDMA Radio Configuration type 4 (RC4) radio configuration type.

8. The method of claim 1, wherein the wireless access system comprises a plurality of base stations which provide the wireless access over individually associated wireless coverage areas, wherein the request to initiate the first communication session is received in a first of the plurality of base stations, and further comprising:
processing the selected radio configuration type for the first communication session and a neighbor list of the first base station to select another radio configuration type for the first communication session and providing the wireless access resources for the first communication session to the first wireless communication device using the other radio configuration type.

9. The method of claim 8, wherein processing the selected radio configuration type for the first communication session and the neighbor list of the first base station to select the other radio configuration type comprises selecting the other radio configuration type based upon utilization of the radio configuration type for wireless access resources of neighbor base stations in the neighbor list.

10. The method of claim 1, further comprising:
reserving wireless access resources for a first radio configuration type before receiving the request to initiate the first communication session for the first wireless communication device.

11. A wireless communication system, wherein a wireless access system provides wireless access to communication services for wireless communication devices, comprising:
the wireless access system configured to receive a request to initiate a first communication session for a first wireless communication device;
the wireless access system configured to process past dropped communication session information for the first wireless communication device to select a radio configuration type of wireless access resources for the first communication session; and
the wireless access system configured to provide the wireless access resources for the first communication session to the first wireless communication device using the selected radio configuration type.

12. The wireless communication system of claim 11, wherein the radio configuration type comprises a spreading code assignment for the first communication session provided to the first communication device.

13. The wireless communication system of claim 11, wherein the past dropped communication session information comprises information correlating radio configuration types in use during past dropped communication sessions between the first wireless communication device and the wireless access system.

14. The wireless communication system of claim 11, wherein the wireless access system is configured to select between the wireless access resources of a first radio configuration type and of a second radio configuration type to select the radio configuration type of the wireless access resources for the first communication session;
wherein if the past dropped communication session information indicates a past dropped communication session amount is above a past dropped communication session threshold for the first radio configuration type, then the wireless access system is configured to select the second radio configuration type as the selected radio configuration type; and
wherein if the past dropped communication session information indicates the past dropped communication session amount is below the past dropped communication session threshold for the first radio configuration type, then the wireless access system is configured to select the first radio configuration type as the selected radio configuration type.

15. The wireless communication system of claim 14, wherein the first radio configuration type comprises a Code Division Multiple Access (CDMA) Radio Configuration type 3 (RC3) radio configuration type, and the second radio configuration type comprises a CDMA Radio Configuration type 4 (RC4) radio configuration type.

16. The wireless communication system of claim 11, wherein the wireless access system comprises a plurality of base stations which provide the wireless access over individually associated wireless coverage areas, wherein the request to initiate the first communication session is received in a first of the plurality of base stations, and comprising:
the wireless access system configured to process the selected radio configuration type for the first communication session and a neighbor list of the first base station to select another radio configuration type for the first communication session and provide the wireless access resources for the first communication session to the first wireless communication device using the other radio configuration type.

17. The wireless communication system of claim 16, wherein the wireless access system is configured to select the other radio configuration type based upon utilization of the radio configuration type for wireless access resources of neighbor base stations in the neighbor list to select the other radio configuration type.

18. A method of operating a wireless communication system, wherein a wireless access system provides wireless access to communication services for wireless communication devices, the method comprising:
- receiving a request to initiate a first communication session for a first wireless communication device;
- processing past dropped communication session information for the first wireless communication device to select a radio configuration type of wireless access resources for the first communication session, wherein the past dropped communication session information comprises information correlating radio configuration types in use during past dropped communication sessions between the first wireless communication device and the wireless access system, and wherein the radio configuration type comprises a spreading code assignment for the first communication session provided to the first communication device;
- notifying the first wireless communication device of the selected radio configuration type for the first communication session; and
- providing the wireless access resources for the first communication session to the first wireless communication device using the selected radio configuration type.

19. The method of claim 18, wherein processing the past dropped communication session information for the first wireless communication device to select the radio configuration type of the wireless access resources for the first communication session comprises selecting between the wireless access resources of a first radio configuration type and of a second radio configuration type, and further comprising:
- if the past dropped communication session information indicates a past dropped communication session amount is above a past dropped communication session threshold for the first radio configuration type, then selecting the second radio configuration type as the selected radio configuration type; and
- if the past dropped communication session information indicates the past dropped communication session amount is below the past dropped communication session threshold for the first radio configuration type, then selecting the first radio configuration type as the selected radio configuration type.

20. The method of claim 19, wherein the first radio configuration type comprises a Code Division Multiple Access (CDMA) Radio Configuration type 3 (RC3) radio configuration type, and the second radio configuration type comprises a CDMA Radio Configuration type 4 (RC4) radio configuration type.

* * * * *